United States Patent
Neri et al.

(10) Patent No.: US 7,267,737 B2
(45) Date of Patent: Sep. 11, 2007

(54) METHOD FOR PRINTING A DYE IMAGE ONTO A THREE DIMENSIONAL OBJECT

(75) Inventors: Kenneth Neri, Cranston, RI (US); Rudolph Mutter, Smithfield, RI (US)

(73) Assignee: Key-Tech, Inc., Warwick, RI (US)

( * ) Notice: Subject to any disclaimer, the term of this patent is extended or adjusted under 35 U.S.C. 154(b) by 9 days.

(21) Appl. No.: 11/276,624

(22) Filed: Mar. 8, 2006

(65) Prior Publication Data

US 2006/0137811 A1  Jun. 29, 2006

Related U.S. Application Data

(62) Division of application No. 10/097,717, filed on Mar. 14, 2002, now Pat. No. 7,137,426.

(60) Provisional application No. 60/275,877, filed on Mar. 14, 2001.

(51) Int. Cl.
*B32B 37/00* (2006.01)

(52) U.S. Cl. .................. 156/230; 156/272.2; 156/499; 156/540

(58) Field of Classification Search ................ 156/285, 156/286, 298, 382, 499, 538, 539, 540, 541, 156/542, 580, 581, 583.1, 230, 272.2, 289
See application file for complete search history.

(56) References Cited

U.S. PATENT DOCUMENTS

| 3,549,446 A | 12/1970 | Bennett et al. | 156/230 |
| 4,157,931 A | 6/1979 | Bricot et al. | 156/230 |
| 4,662,966 A | 5/1987 | Sumi et al. | 156/230 |
| 4,670,084 A | 6/1987 | Durand | 156/540 |
| 5,152,861 A | 10/1992 | Hann | 156/230 |
| 5,641,372 A | 6/1997 | Okuno | 156/230 |
| 6,136,126 A | 10/2000 | Fenzi | 156/230 |

FOREIGN PATENT DOCUMENTS

| EP | 0119548 B1 | 3/1983 |
| EP | 0511605 A1 | 4/1992 |
| FR | 2364130 | 4/1978 |
| WO | WO 01/96123 A1 | 12/2001 |

*Primary Examiner*—James Sells
(74) *Attorney, Agent, or Firm*—Barlow, Josephs & Holmes, Ltd.

(57) ABSTRACT

The present invention provides an apparatus and method for applying preselected dye images to three dimensional objects, having plastic outer surfaces, utilizing flexible carrier sheets bearing dyes in the mirror images of the preselected images, where the sheets are overlaid in registration with the objects and maintained in pressurized engagement therewith while the sheets and the objects are heated. The present invention includes a bed for receiving at least one three-dimensional object member thereon with a flexible dye bearing carrier sheet placed in registration on the object and a resiliently flexible membrane, which is positionable over the sheet on the member. A vacuum assembly of the apparatus is operable to evacuate the area between the membrane and the bed in order to draw the membrane into pressurized engagement with the flexible sheet on the member thereby drawing the flexible sheet around the various surfaces of the three dimensional object. Radiant heating elements are operable both to preheat the carrier sheet, improving its flexibility and to heat the membrane after the vacuum assembly has been actuated, whereby the dye on the sheet is applied to the surfaces of the object to produce the preselected image thereon.

21 Claims, 4 Drawing Sheets

METHOD FOR PRINTING A DYE IMAGE ONTO A THREE DIMENSIONAL OBJECT

CROSS REFERENCE TO RELATED APPLICATION

This application is a divisional of U.S. Ser. No. 10/097,717, filed on Mar. 14, 2002, now U.S. Pat. No. 7,137,426, which claims priority to earlier filed Provisional Application No. 60/275,877, filed Mar. 14, 2001.

BACKGROUND OF THE INVENTION

The instant invention relates to the application of dye images to various types of three dimensional objects, and more particularly to an apparatus and method for applying dye images to three dimensional objects utilizing a sheet or sheets bearing dyes in the mirror images of the desired images, wherein the dyes are of the type which require heat for the application thereof.

Processes for applying disperse dye images to various types of members, wherein dyes are transferred from carrier sheets bearing the dyes in the mirror images of the desired images, are generally known in the printing art. Other processes that are generally related to the art of the present invention are also generally known in the dye sublimation printing field. In general, processes of this type are carried out by first printing an image to be transferred onto a carrier sheet in the reverse orientation from the desired resultant image. The carrier sheet bearing the dye image is placed over an object so that the image is in the desired registration thereon. After the image is placed, heat and pressure are simultaneously applied to the sheet to transfer the dye image from the sheet to the object so that the desired image is permanently produced thereon.

Currently, three-dimensional printing is accomplished as discussed above, using the same techniques and technology developed originally for two-dimensional printing. While this process is generally well known in the prior art, it produces generally unacceptable results when applied to three-dimensional objects. For example, many cellular telephones have replaceable covers and it is desirable to provide replacement covers that bear printed images over the entire surface (front and sides) of the cover. However, when an image is applied using the two dimensional printing technique of the prior art, the image can easily be applied to the front surface of the object, but when the carrier sheet is bent around the contours of the cover it tends to gather and crease resulting in a poor quality transfer image. The drawback in the current technology is that while the paper carrier worked well for flat two-dimensional objects, it does not provide a great degree of flexibility necessary to mold to the required three-dimensional shapes. This arrangement results in uneven and often wrinkled image transfer, as the paper does not firmly and uniformly contact the substrate object as the carrier sheet will bunch and gather at the corners and edges of the object. Further, because of the relative lack of flexibility exhibited by the carrier sheets, it makes the simultaneous application and transfer of a dye image from a carrier sheet to the top and sides of a three-dimensional object very difficult.

In addition, another drawback to the prior art technique is that the infrared heating array used to effect the transfer consists of a flat array of infrared heat lamps. This configuration creates further problems when transferring images onto three dimensional objects because it does not provide uniform heating along the top and sides of the three dimensional object resulting in uneven image transfer along the sides of the object.

SUMMARY OF THE INVENTION

The apparatus and method of the present invention is operable for carrying out the effective transfer of a dye image from a transfer carrier sheet to a three dimensional object while overcoming the poor quality transfer seen in the prior art. The apparatus of the present invention generally includes a bed assembly having a surface with a fixture mounted thereon for receiving an object having plastic outer surfaces to be printed, a dye bearing flexible transfer carrier sheet that is positioned over the object to be printed, a flexible membrane that is positionable over the dye bearing sheet, the object and a portion of the bed assembly surface, a vacuum means for drawing the membrane into pressurized communication with the carrier sheet to effect the pressurized engagement thereof with the object to be printed, and means for selectably heating the sheet with the dye thereon, the object, the membrane, and optionally preheating the carrier sheet thereby improving its flexibility and to transfer the dye to the object to produce the desired image thereon. In the preferred embodiment of the apparatus of the instant invention, the heating means comprises one or a plurality of radiant heating elements which emit radiant heat, preferably primarily in the infrared wavelength range, to effect heating of the flexible membrane, the carrier sheet, the dye and the object to which the dye image is to be applied. In addition, the radiant heating means is constructed so that it emits radiation towards the bed assembly surface from various angles whereby a three-dimensional member on the bed assembly surface can be heated uniformly. In this regard, preferably the radiant heating means comprises infrared radiation emitter tubes in an inverted U-shaped configuration. Additionally, a reflector array directs radiation from the emitter towards surfaces of the object that do not directly receive radiation such as the ends of the cell phone cover. Also, in the preferred embodiment, the flexible membrane is preferably matched with the radiant heating means so that it is specifically absorptive to radiation within the wavelength range emitted therefrom to achieve optimum heating efficiency.

The present invention can be used for applying one or a plurality of images to a single object or for simultaneously applying a plurality of dye images to a plurality of objects even though the various objects may have irregular printing surfaces and are three-dimensional in nature. In this regard, because the apparatus of the instant invention utilizes a flexible membrane and a means for applying a vacuum to the membrane to effect pressurized communication between the image carrier sheet and an object disposed on the bed assembly surface, a plurality of objects can be positioned on the bed assembly surface, and dye images can be simultaneously applied to all of the members with one carrier sheet containing an array of images or a plurality of carrier sheets, each containing one image. This is because the flexible membrane will simultaneously conform to the configurations of all of the members and cause pressure to be applied to all of the various surfaces of the members notwithstanding some irregularities in the surface configurations thereof. In addition, it is possible to simultaneously apply dye images to two or more different surfaces of a single member with the apparatus of the instant invention. Specifically, by utilizing a dye bearing sheet or carrier having a plurality of transfer images arranged thereon wherein the sheet is sufficiently flexible so that it can conform to the various surfaces of a single three dimensional object, when the membrane is moved into pressurized communication with the member the sheet will be positioned in pressurized engagement with the different surfaces thereof so that the different images are applied to the appropriate surfaces. It should be pointed out, however, that when applying images to surfaces which are in nonparallel relation to the bed assembly surface it is important that the radiant heating means be of the type hereinabove described herein radiation is directed at the bed assembly surface from various angles so that all of the surfaces of the member are heated uniformly.

One particular use for the apparatus of the instant invention is in the application of dye transfer images to the interchangeable outer covers for cellular telephones. Specifically, the apparatus of the present invention can be constructed so that it is adapted to receive an array of several cellular telephone covers and simultaneously apply dye images to the array of covers in a batch fashion. In this regard, when the apparatus of the instant invention is constructed for cellular telephone covers, it further includes an array of receiver dies installed on the bed assembly surface, whereby each die receives a single cell phone cover and maintains the cover in substantially stationary relation on the bed while the carrier sheet is placed in registration over the cell phone cover and the desired images are applied thereto. A single sheet or a sheet having a plurality of dye images thereon, which are in the mirror images of the desired images, is overlaid on the cell phone covers so that the images are in the desired orientation thereon. In the preferred embodiment, a plurality of registration pins are provided on the frame, and a plurality of apertures are provided in the sheet for receiving the registration pins to assure proper registration of the sheet relative to the array of cell phone covers residing on the bed. The carrier sheet is sufficiently flexible to allow the sheet to be drawn onto and around the contours of the cell phone covers so as to simultaneously contact both the top surfaces and side surfaces of the covers allowing an image to be applied to all of the covers in a three dimensional fashion. The dye carrier sheets are placed over the covers as described above, the membrane is placed over the bed and covers, then the membrane is evacuated of air so that it is drawn into pressurized communication with the covers, and heat is applied. An additional step that includes preheating the carrier sheets may be included before evacuating the membrane to improve the flexibility of the carrier sheet to allow it to be drawn into closer contact with the covers when the membrane is evacuated.

Accordingly, it is a primary object of the present invention to provide an apparatus and method for applying a dye image to a three dimensional object utilizing a carrier sheet bearing a dye in the mirror of said image, the dye being of the type requiring heat for the application thereof and having a melting point which is below the melting point of the material comprising the object. A further object of the present invention is to provide an apparatus and method for simultaneously applying dye images to a plurality of the surfaces of a three-dimensional object. Still another object of the present invention is to provide an apparatus and method for applying a dye image to a three dimensional plastic object wherein a dye bearing sheet is first overlaid on the object, a flexible membrane is overlaid on the sheet, and vacuum is applied to the membrane to effect the pressurized engagement of the dye bearing sheet with the object and wherein thereafter radiation is directed toward the sheet to effect the heating of the dye and the object so that the image is transferred to the object.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
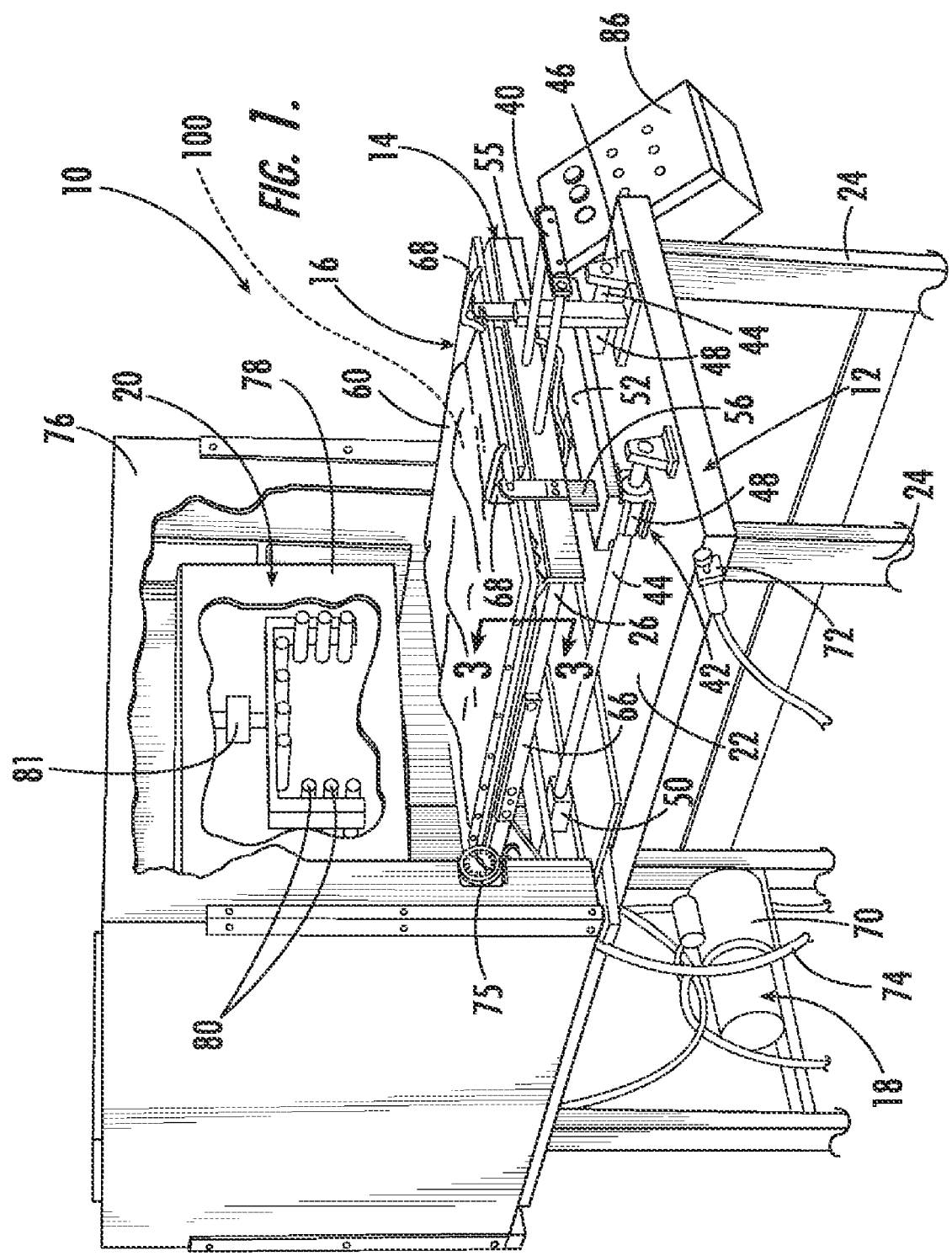
FIG. 1 is a perspective view of the apparatus of the present invention with the flexible membrane thereof in the closed operative position.

Referring now to the drawings, the apparatus of the instant invention is illustrated and generally indicated at 10 in FIG. 1. The apparatus 10 is operable for applying dye images to three dimensional objects, particularly objects with plastic outer surfaces, in accordance with processes of the type wherein a flexible sheet bearing a transfer dye in the mirror of a desired image, known as a carrier sheet, is overlaid on the object and the image is transferred to the object through the application of heat to the dye while the carrier sheet is maintained in pressurized engagement with the object. The apparatus 10 generally comprises a base 12, a bed assembly 14, a flexible membrane assembly 16 that is positionable in overlying relation on the bed assembly 14, a vacuum assembly 18 and a radiant heating assembly 20. The vacuum assembly 18 is in fluid communication with the bed assembly and is operable for evacuating the area between the membrane assembly 16 and the bed assembly 14 when the membrane assembly 16 is positioned in overlying relation on the bed assembly 14. The bed assembly 14 and the membrane assembly 16 are movable to allow them to be selectively positioned beneath the radiant heating assembly 20 to effect radiant heating of the membrane assembly 16. Accordingly, when an object 100, such as a cell phone cover, is positioned on the bed assembly 14 and a sheet bearing dye in the mirror image of a preselected image is overlaid on the object, the apparatus 10 is operable for transferring the dye image from the sheet to the member to produce the preselected image thereon. Specifically, by evacuating the area between the membrane assembly 16 and the bed assembly 14 with the vacuum assembly 18, and by thereafter positioning the membrane assembly 16 and the bed assembly 14 under the radiant heat assembly 20, heat and pressure are simultaneously applied to the dye bearing sheet to improve the contact between the object and the sheet and to transfer the dye therefrom to the object on the bed assembly 14.

Figure 2:
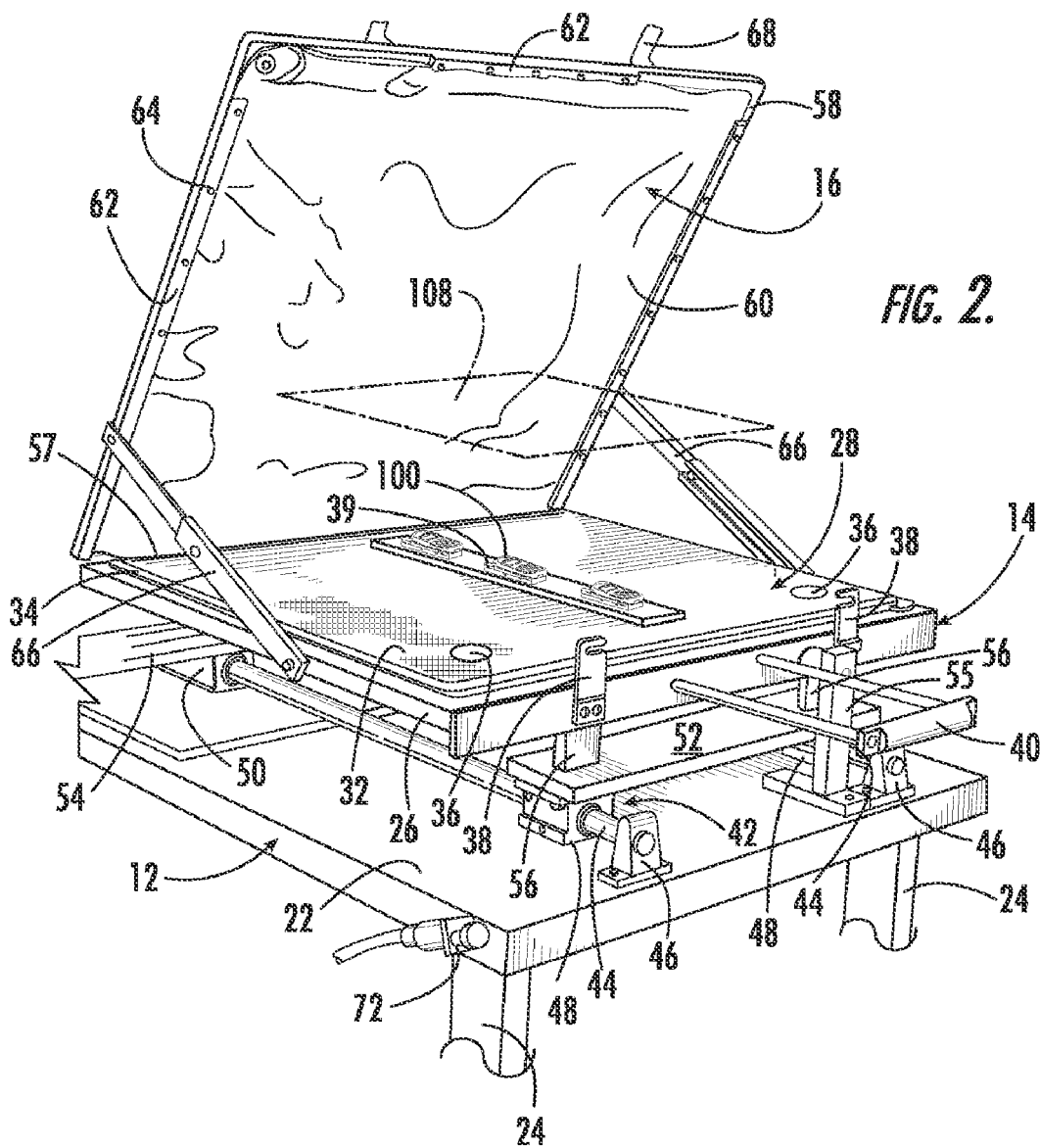
FIG. 2 is an enlarged perspective view of the front portion of the apparatus with the membrane in the raised inoperative position.
Figure 3:
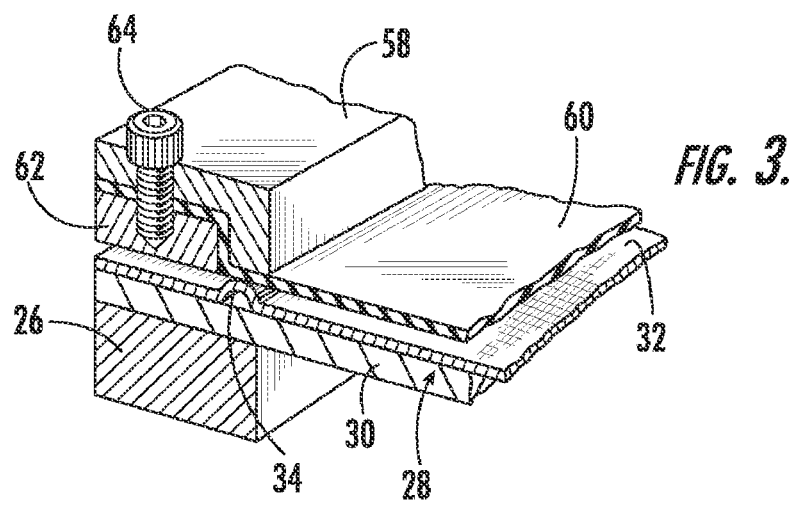
FIG. 3 is a sectional view taken along line 3-3 in FIG. 1.
Figure 4:
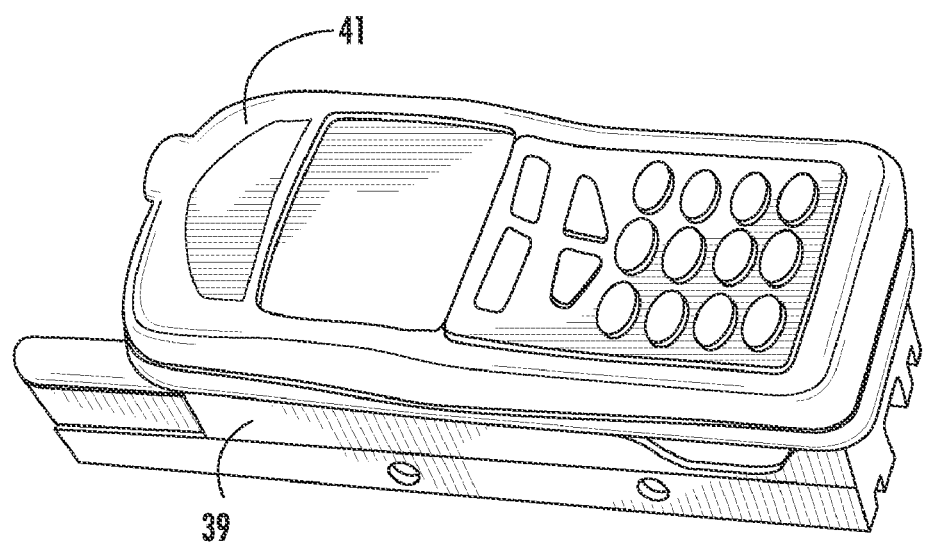
FIG. 4 is a detail perspective view of a support fixture mounted on the bed assembly of the present invention.

Referring now to FIGS. 1 and 2, it can be seen that the base 12 of the apparatus of the present invention 10 includes a table-like structure having a tabletop 22 and legs 24. The base assembly 12 provides a supporting structure for the remainder of the apparatus 10 as will be further described below. The bed assembly 14 is most clearly illustrated in FIGS. 1, 2 and 3 and includes a rectangular frame 26 and a support plate portion 28 that defines a supporting surface for receiving an object or a plurality of objects in the apparatus 10 for the application of dye images thereto. For illustration purposes only, the present invention is shown in connection with a single column of three objects 100 on the bed assembly 14 with corresponding three support fixtures 39, as shown in FIG. 4. It should be understood that the present invention can accommodate any array of objects on a suitably configured bed assembly 14, such as a 3×3 array of objects 100. As illustrated in FIG. 3, the plate portion 28 comprises a lower substrate 30 having a lamination 32 overlaid thereon, the lamination 32 defining the upper supporting surface of the plate portion 28. The lamination 32 is preferably of a substantially rigid construction and has a textured grid pattern on the upper surface thereof whereby an even vacuum can be applied over the entire area between the bed assembly 14 and the membrane assembly 16 when the membranes assembly 16 is in the lowered position. Integrally molded in the lamination 32 is a raised ridge 34 that extends around the central portion thereof in slightly inwardly spaced relation to the periphery of the lamination 32. Provided in the plate portion 28 are vacuum caps 36 having peripheral openings therein (not shown) for evacuating the area between the bed assembly 14 and the membrane assembly 16 when the membrane assembly 16 is overlaid on the bed assembly 14, as will hereinafter be more fully described. Also included in the bed assembly 14 are latch members 38 and a handle 40.

It should be understood that manipulation of handle 40 is just one way to move the bed assembly 14. It is also possible to employ an automated system (not shown) where pneumatics automatically move the bed assembly 14. Such a transport system can be easily integrated with the control box to automate the printing procedure in accordance with the present invention.

Finally, at least one support fixture 39 is rigidly attached to the surface 32 of bed assembly 14. The support fixture 39 is uniquely shaped to frictionally receive and retain the three dimensional object to be printed, as will be further discussed below, and may be formed by molding silicone rubber material 41 onto the support fixture 39 in the exact shape of the object to be received. For the arrangement shown in the figures, an appropriate 1×3 arrangement of support fixtures 39 is employed.

A mounting assembly 42 is included in the bed assembly 14 for the mounting thereof on the base 12. The mounting assembly 42 includes a pair of slide rods 44 which are mounted in spaced relation above the table top 22 and extend rearwardly with front mounts 46 and rear mounts (not shown). Received on the rods 44 are front and rear slide members 48 and 50, respectively; and front and rear cross members 52 and 54, respectively, extend between the two front slide members 48 and between the two rear slide members 50, respectively. Front vertical members 56 and rear vertical members (not shown) extend upwardly from the cross members 52 and 54, respectively, and are secured to the frame 26, whereby the frame 26 is slideably mounted on the rods 44. A front stop member 55 extends upwardly from the tabletop 22 to limit the extent of the forward movement of the bed assembly 14. Further, the rods 44 may extend rearwardly, entirely through the heating assembly 20 and out the rear of the heating assembly 20 to allow two bed assemblies 14 to be operated simultaneously in the present invention 10. It should be understood that various mechanisms and structures may be used to facilitate transit of the bed assembly 14.

FIG. 3 illustrates a close-up cross-sectional view of the membrane assembly 16. While this assembly 16 is preferred, many other configurations can be employed to effectively move the membrane 60 over the surface 32 of the bed with objects 100 therebetween for printing. Other similar configurations may be employed and still be within the scope of the present invention.

The membrane assembly 16 is hingedly mounted on the bed assembly 14 along the rear edge thereof as at 57 and includes an outer frame 58 and a resilient, flexible membrane 60 that is secured to the frame 58 with anchor strips 62 and screws 64, as shown in FIGS. 2 and 3. As can be seen in FIG. 3, the frame 58 has an L-shaped cross-sectional configuration, and the strips 62 are dimensioned to closely fit within the cross-section of the frame 58 so that the membrane 60 is captured therebetween and secured to the frame 58. The size of the frame 58 is specifically dimensioned so that when the membrane assembly 16 is lowered into overlying relation on the bed assembly 14, the frame 58 overlies the ridge 34 thereby "pinching" the membrane 60 therebetween creating a seal between the periphery of the membrane 60 and the edge of the bed assembly 14. Conventional telescoping arms 66 may extend between the bed assembly 14 and the frame 58 to assist in maintaining the membrane assembly 16 in the upwardly hinged or open disposition illustrated in FIG. 2 when desired. Handles 68 are attached to the frame 58 and engage with the latch members 38 when the membrane assembly 16 is in the lowered position, thereby maintaining the membrane assembly 16 in the closed position thereof illustrated in FIG. 1 and further assisting in sealing the membrane assembly 16 to the bed assembly 14.

The vacuum assembly 18 includes a vacuum pump 70 that is mounted on the base 12 and is actuated by a manual switch 72 mounted on the tabletop 22. The vacuum pump 70 is fluidly connected through vacuum lines 74 to the vacuum caps 36 on the bed assembly 14 for drawing a vacuum in the area between the membrane assembly 16 and the bed assembly 14 when the membrane assembly 16 is in its lowered or closed position. Preferably the pump 70 is operable to produce a vacuum in the range of approximately twenty-eight inches of mercury as indicated by a gauge 75 in order to effect the desired pressurized communication between the membrane 60 and various objects positioned on the bed assembly 14, although the operation of the apparatus 10 at other vacuum levels is possible.

Figure 6:
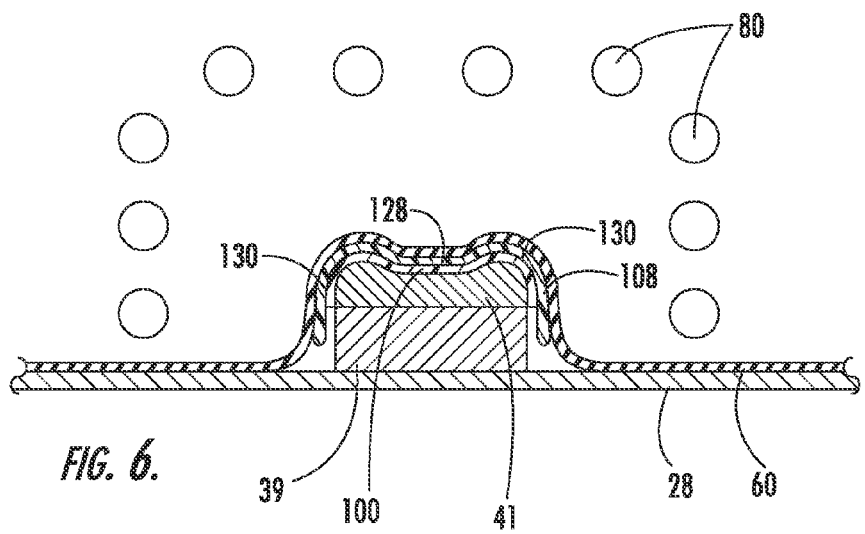
FIG. 6 is a schematic sectional view illustrating the application of heat to a cellular telephone case utilizing an array of radiation emitters having parabolic reflectors.

Referring back to FIG. 1, the radiant heating assembly 20 is shown to include a housing 76 in which a hood 78 is mounted. A plurality of preferably tubular radiant heating elements 80 are mounted in the hood 78. As shown in FIG. 6, the radiant heating elements 80 are configured so that several elements 80 direct their energy directly toward the object. This configuration is important in the present invention to enable radiant energy to be directed in a substantially uniform fashion to the top and sides of the three-dimensional objects being printed as will be further described below. For example, as in FIG. 6, a total of ten emitters 80 are employed, three on each side and four on the top of the object 100 to be printed upon.

Figure 7:
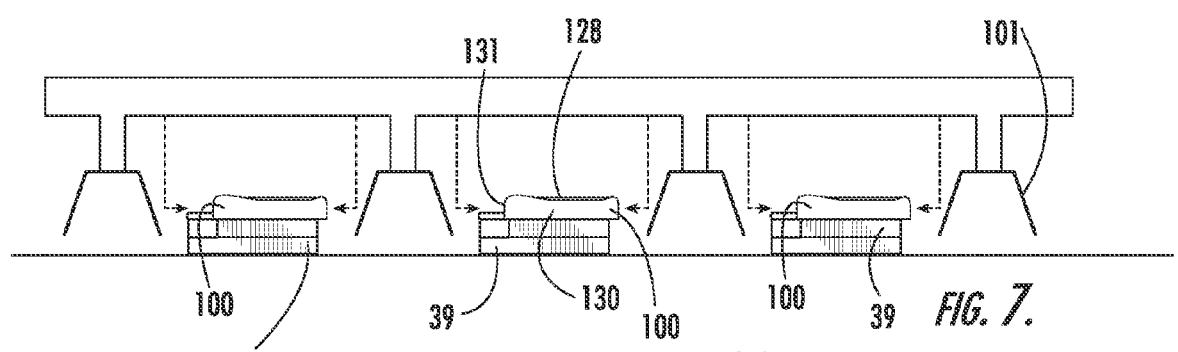
FIG. 7 is a side view of the integrated reflector assembly with infrared heaters removed for clarity.

The radiant heaters of FIG. 6, direct radiation to the top surface 128 and sides 130 of object 100. However, for full three dimensional printing, radiation must also be imparted onto the object ends 131. FIG. 7 shows a side view of the integrated array of reflectors 101 in accordance with the present invention. To accomplish this, reflectors 101 with angles outer surfaces reflect radiation, as shown by the broken lines, from the radiation emitters 80 to deliver radiation to the object ends 131.

In the preferred embodiment of the apparatus 10, the emitters 80 are constructed so that they emit radiation predominantly within the infrared range, and the membrane 60 is formed from a silicone rubber material that is specifically receptive to radiation within the wavelength range emitted by the emitters 80 in order to achieve optimal heating conditions. Further, in the preferred embodiment, the apparatus 10 includes conventional adjustable means (not shown) for controlling the heating assembly 20 to effect the energization thereof for predetermined time intervals, and conventional adjustable feedback control means (not shown) for controlling the heating elements 80 to effect heating of the membrane 60 to the desired temperature. It will be understood, however, that the operation of the apparatus 10 will be different for different types of members and for different dyes and different carrier sheet materials and construction and that, therefore, adjustments in the heating cycles of the apparatus 10 will be necessary for different operations. For example, the dyes and carrier sheet materials may require the alteration of the timing and amount of vacuum pulled during the printing process.

Figure 5:
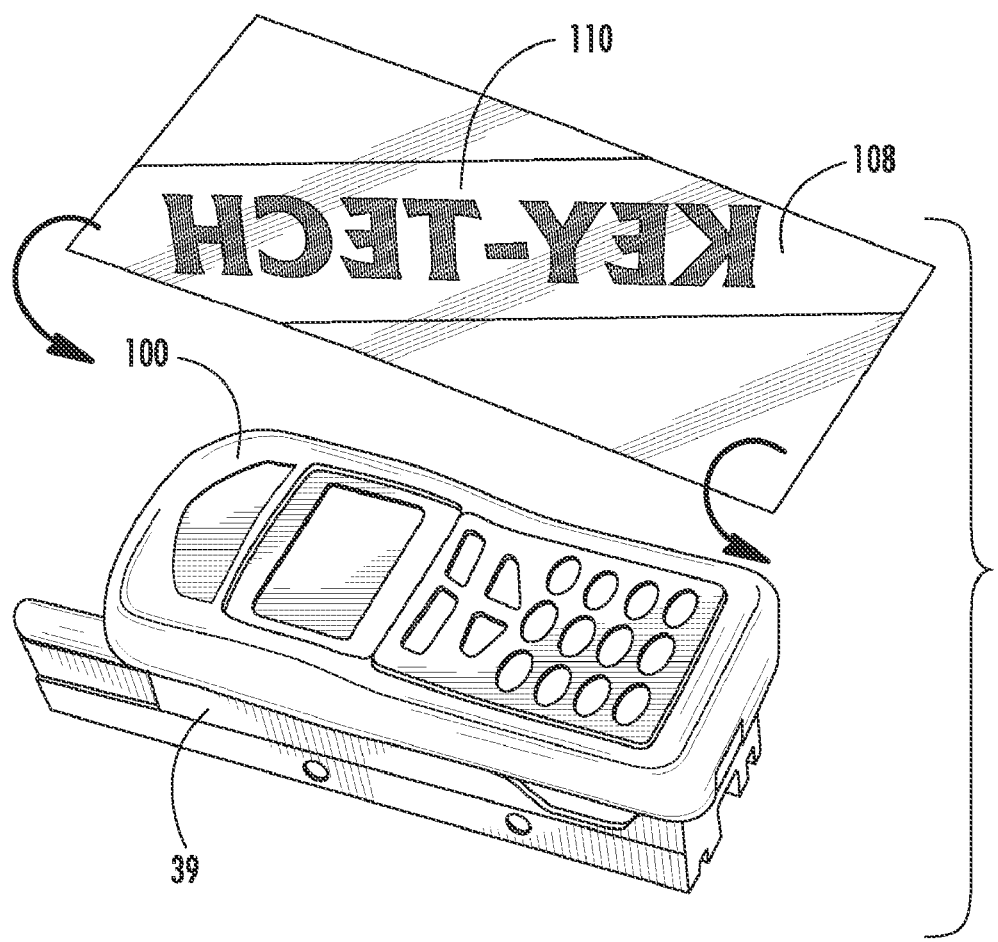
FIG. 5 is a perspective view of a cellular telephone case received on a support fixture and a dye bearing carrier sheet which is receivable in overlying relation on the cellular telephone case.

Although it will be understood that the apparatus of the instant invention is operable for applying dye images to various types of objects, it has proven to be particularly effective for simultaneously applying dye images to several surfaces of a three dimensional object such as a cellular telephone case 100. Turning to FIGS. 4 and 5, one particularly useful and effective embodiment of the apparatus of the instant invention 10 is adapted for applications of this type and therefore further includes a support fixture 39 for receiving and positioning one or an array of cellular telephone cases 100 on the bed assembly 14. Each support fixture 39, as illustrated in FIG. 4, has a molded component 41 on the upper surface thereof that is tailored to the specific object to be printed, in this case a cellular telephone case 100. The molded component 41 frictionally receives and retains the case 100 and maintains its position on the bed assembly 14 during the entire printing operation. It will be understood that carrier fixtures 39 of this type can be constructed for receiving various numbers of objects to be printed 100 and can be customized for receiving and retaining any variety of three dimensional object as desired. The cellular telephone case 100 is pressed into place over the molded portion 41 of the carrier fixture 39 as seen in FIG. 5. A sheet 108 bearing dye images 110 is placed over the cellular telephone case 100 in registration therewith.

Figure 9:
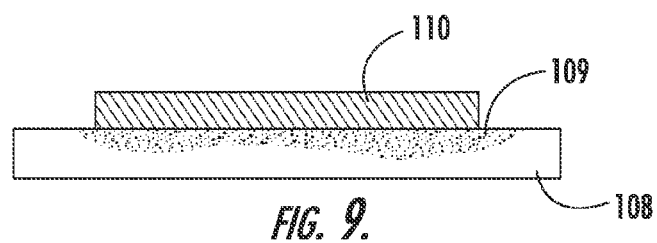
FIG. 9 is a cross-section view of the carrier sheet in accordance with the present invention.

As shown in FIG. 9, the carrier sheet 108 is preferably a fabric material with a receptor coating 109 applied to one surface. The receptor coating may be a thermoset polymer, silicone-based material or other suitable coating for permitting application of a dye image 110 thereon. The selection of the type of receptor coating 109 depends on the fabric material and the dye employed. Further, the fabric 108 may be of a woven, non-woven or a film. The material for the fabric 108 may be a polyester or polymer material or variation thereof. Accordingly, when heat and pressure are simultaneously applied to the sheet 108, it conforms to the shape of the upper surface of the cell phone case 100. Additionally, the sheet 108 is provided as being flexible to smoothly transition around the edges and corners of the cell phone case 100, intimately contacting the sides of the case 100, whereby a clear image can be applied simultaneously to the top and side surfaces of the cell phone case 100.

However, in actual application, the upper surface of the sheet 108 is preferably coated with the receptor coating 109 as hereinabove mentioned, and the dye images 110 which comprise dye in the mirror images of the preselected images, which are to be applied to the cell phone case 100, are disposed on the upper surface of the sheet 108. The dye employed may be a disperse dye type which transfers through a melting or sublimation mechanism or combination of both, for example. The preferred dye type is one which transfers by a melting mechanism. Other types of dyes which are known in the art may be used in accordance with the present invention.

The images 110 are positioned on the sheet 108 so that when the sheet 108 is overlaid on the cell phone case 100 as hereinabove set forth, the images 110 are properly oriented in alignment with the top surface of the cell phone case 100 and the sides of the case 100 when the vacuum is drawn. Accordingly, when heat and pressure are applied to the sheet 108, the dye comprising the images 110 is transferred to the cell phone case 100 to produce the preselected images on the top and side surfaces.

The present invention 10 is particularly operable for applying dye images to several different nonparallel surfaces of a three dimensional object. In this regard, referring to FIG. 6, it will be seen that the sheet 108 which is to apply a continuous image 110 to the top 128 and side 130 non-parallel surfaces of a three dimensional object 100 to be printed member is shown drawn under a vacuum beneath the membrane 60. As schematically illustrated in FIG. 6, when the sheet 108 is overlaid on the object 100 and the membrane 60 is urged into pressurized engagement with the sheet 108, the sheet 108 conforms over the top 128 surface and is drawn into contact with the side surfaces 130 and end surfaces 131, as seen in FIG. 7, and is maintained in pressurized engagement therewith. Accordingly, when the emitters 80 are energized to heat the membrane 60, the image 110 is applied to the top surface 128, side surfaces 130 and end surfaces 131 of the object 100. As stated above, reflectors 101 enable transmission of radiation onto the end surfaces 131 of object 100.

Generally, therefore, the method of operation of the apparatus 10 to effect the application of a preselected dye image to a three dimensional object 100 is accomplished by positioning the object 100 on the molded portion 41 of the carrier fixture 39, which is mounted to lamination 32 and overlying a carrier sheet 108 bearing a dye image to be transferred, preferably a disperse dye which melts, where the image is the mirror image of the preselected image, over the object 100 so that the mirror image is in the desired orientation thereon. The object 100 itself is preferably a plastic material having a melting point that is above the melting point of the dye. The membrane assembly 16 is then moved to its lowered or closed position illustrated in FIG. 1, and the handles 68 are moved into interlocking engagement with the latch members 38. The switch 72 is then manipulated to actuate the vacuum assembly 18 whereby the membrane 60 is drawn into pressurized communication with the sheet 108 overlying the object 100 to effect the pressurized engagement of the sheet 108 with the object 100. The bed assembly 14 and the membrane assembly 16 are then moved rearwardly in the apparatus 10 so that the membrane 60 is disposed beneath the hood 78. Thereafter the control box 86 is manipulated to energize the radiant heating elements 80 to effect heating of the membrane 60 so that heating of the dye and the plastic member beneath the membrane 60 is effected to transfer the dye to the member. It can be seen that since the image on the carrier sheet 108 includes portions of the image that wrap down along the sides 130 of the object 100 that the U-shaped configuration of the heating elements 80 assists in providing uniform heating not only on the top surface 128 of the object 100 but also along the sides 130 and ends 131 of the object 100 to effect even transfer of the image to the object 100. After the desired image has been applied to the member in this manner, the heating elements 80 and the vacuum assembly 18 are deenergized. The bed assembly 14 and the membrane assembly 16 are moved forwardly and out from beneath the hood 78. The membrane assembly 16 may then be raised to the open position thereof to remove the member with the preselected image thereon.

Alternatively, pneumatics (not shown) may be employed to automate and facilitate the printing process of the present invention. In this automated procedure, the membrane assembly 16 is closed manually on the bed assembly 14 and the vacuum is activated by depressing a switch on the control box 86 as opposed to the manual switch 72. When the vacuum is pulled on the membrane assembly 16 and then reaches a predetermined setting, the bed assembly 14 pneumatically moves under the hood 78 automatically. The bed assembly 14 then stays under the heating assembly 20 for a predetermined time established by a timer (not shown) on the control box 86, after which it withdraws automatically. When the bed assembly 14 is positioned under the heating assembly 20, the heating element array 80 is automatically lowered by a piston 81, as shown in FIG. 1, around the objects 100 as shown in FIG. 1. When heating and printing is complete, the heating element array 80 is automatically raised and the bed assembly 14 is pneumatically removed from below the heating assembly. The foregoing, is just one of many ways to automate the printing process in accordance with the present invention.

Alternatively, the vacuum may be pulled after the carrier sheet 108 is placed over the object 100 and exposed to the heaters 80 for a predetermined period of time. By delaying the pulling of the vacuum and preheating the carrier sheet 108, it becomes more flexible thereby allowing it to more easily conform to the irregular surface and three-dimensional nature of the object 100 being printed when the vacuum is later pulled. In particular, the carrier sheet 108 can be contoured more smoothly over the edges and corners of the object 100 making a smooth transition from the top surface 128 to the side surfaces 130, thus providing improved transfer of image 110. Still further, depending on the circumstances, the vacuum may be partially pulled prior to exposure to the heaters 80. Once exposed to the heaters 80, the vacuum may then be pulled to its maximum.

Figure 8:
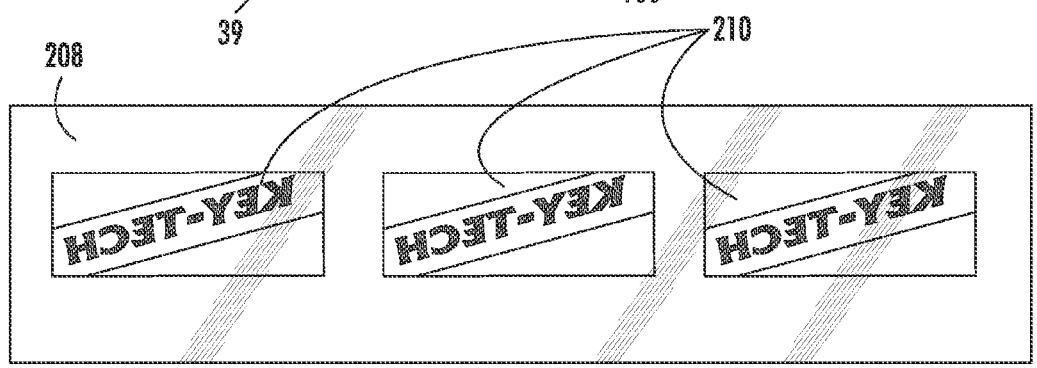
FIG. 8 is a plan view of an alternate embodiment of the carrier sheet of the present invention.

Still further, as shown in FIG. 8, a single carrier sheet 208 with an array of printed mirror images 210 thereon may be provided instead of an individual carrier sheet 108, as shown in FIG. 6. The unitary carrier sheet 208 of FIG. 8 can be registered and aligned with the objects 100 to be printed using pins and other structures known in the art.

It is seen, therefore, that the present invention provides an effective apparatus and method for applying images 110 to the plastic surfaces of three dimensional objects 100, particularly plastic objects, utilizing dye bearing sheets 108. For example, the plastic members may be solid or a coating of plastic on a non-plastic object, such as one made of metal. Such a solid plastic member or plastic coating provides the necessary substrate for printing in accordance with the present invention. Because the apparatus of the instant invention uses the flexible membrane 60 for applying pressure to various members when the vacuum assembly 18 is activated, the apparatus of the instant invention is operable for applying images to surfaces that are not co-planar, such as the composite surface defined by an interchangeable cell phone case 100. Hence the apparatus and method of the present invention is operable for applying one or a plurality of dye images to one or more plastic objects having various three dimensional configurations. Accordingly, it is seen that the apparatus of the instant invention represents a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of simultaneously applying preselected dye images to several surfaces of at least one three dimensional object comprising:
    providing at least one three dimensional object having an outer plastic surface to receive an image, said three dimensional object having a top surface and a plurality of side surfaces adjacent to and not co-planar with said top surface;
    placing a flexible image carrier sheet in registration over said three dimensional object, said image carrier sheet having at least one dye image printed thereon, wherein said dye image is the mirror image of said preselected dye image;
    lowering a resilient flexible membrane over said three dimensional object and said image carrier sheet;
    establishing a vacuum under said membrane to cause said flexible image carrier sheet to conform into pressurized communication with said top surface and said side surfaces of said three dimensional objects;
    providing an array of radiation emitters wherein said array is configured in substantially a U-shape to direct radiation toward said top and said side surfaces of the three dimensional object; and
    heating said membrane, said image carrier sheet and said three dimensional object in a uniform fashion with said array of radiation emitters to cause said preselected dye image to transfer from said image carrier sheet onto said top surface and said side surfaces of said three dimensional object in a uniform manner.

2. The method applying preselected dye images of claim 1, further comprising;
    placing said three dimensional object onto a support fixture, said support fixture having at least one die mounted thereon suitable for frictionally receiving and retaining said three dimensional object, before said step of placing said flexible image carrier sheet.

3. The method applying preselected dye images of claim 1, wherein said at least one three dimensional object is an array of a plurality of three dimensional objects.

4. The method applying preselected dye images of claim 3, wherein said image carrier sheet is one sheet containing a plurality of images corresponding to said plurality of three dimensional objects.

5. The method applying preselected dye images of claim 3, wherein said image carrier sheet is a plurality of sheets each containing one image to be transferred, each placed in respective registration with said array of said plurality of three dimensional objects.

6. The method applying preselected dye images of claim 1, wherein said flexible image carrier sheet includes a fabric material.

7. The method applying preselected dye images of claim 6, wherein said fabric material is a woven material.

8. The method applying preselected dye images of claim 6, wherein said fabric material is a non-woven material.

9. The method applying preselected dye images of claim 6, wherein said fabric material is a film.

10. The method applying preselected dye images of claim 1, further comprising:
preheating said image carrier sheet after said step of lowering said flexible membrane and prior to establishing a vacuum, to increase the flexibility of said image carrier sheet.

11. The method applying preselected dye images of claim 3, further comprising the steps of:
providing a plurality of heat reflectors;
placing said plurality of heat reflectors between said plurality of three dimensional objects thereby facilitating heating of said plurality of said side surfaces of said three dimensional objects.

12. A method of simultaneously applying preselected dye images to surfaces of an array of three dimensional objects, comprising:
providing a plurality of three dimensional objects; each having an outer plastic surface to receive an image, each of the three dimensional objects having a top surface and a plurality of side surfaces adjacent to and not co-planar with the top surface;
respectively placing a flexible image carrier sheet over the three dimensional objects, the flexible image carrier sheet having at least one dye image printed thereon, wherein the dye image is the mirror image of the preselected dye image;
lowering a resilient flexible membrane over the three dimensional objects and the image carrier sheet over each of the three dimensional objects;
establishing a vacuum under the membrane to cause the flexible image carrier sheet to conform into pressurized communication with the respective top surface and side surfaces of the three dimensional objects;
providing a plurality of heat reflectors; placing the plurality of heat reflectors between the plurality of three dimensional objects thereby facilitating heating of the side surfaces of the three dimensional objects; and
heating the membrane, the image carrier sheets and the three dimensional objects in a uniform fashion to cause the preselected dye images to transfer from the image carrier sheets onto the respective top surface and side surfaces of the three dimensional objects in a uniform manner.

13. The method applying preselected dye images of claim 1, further comprising;
placing said three dimensional object onto a support fixture, said support fixture having at least one die mounted thereon suitable for frictionally receiving and retaining said three dimensional object, before said step of placing said flexible image carrier sheet.

14. The method applying preselected dye images of claim 1, wherein said image carrier sheet is one sheet containing a plurality of images corresponding to said plurality of three dimensional objects.

15. The method applying preselected dye images of claim 1, wherein said image carrier sheet is a plurality of sheets each containing one image to be transferred, each placed in respective registration with said array of said plurality of three dimensional objects.

16. The method applying preselected dye images of claim 1, wherein said flexible image carrier sheet includes a fabric material.

17. The method applying preselected dye images of claim 16, wherein said fabric material is a woven material.

18. The method applying preselected dye images of claim 16, wherein said fabric material is a non-woven material.

19. The method applying preselected dye images of claim 16, wherein said fabric material is a film.

20. The method applying preselected dye images of claim 1, further comprising:
preheating said image carrier sheet after said step of lowering said flexible membrane and prior to establishing a vacuum, to increase the flexibility of said image carrier sheet.

21. The method applying preselected dye images of claim 1, wherein said step of heating includes heating with an array of radiation emitters wherein said array is configured in substantially a U-shape thereby uniformly directing radiation therefrom toward said top and side surfaces of said three dimensional object.

* * * * *